United States Patent [19]
Newbold et al.

[11] Patent Number: 5,160,514
[45] Date of Patent: Nov. 3, 1992

[54] SWEEP VALVE FOR DEHYDRATION VALVE

[75] Inventors: David D. Newbold; Raymond H. Colton, both of Bend, Oreg.

[73] Assignee: Bend Research, Inc., Bend, Oreg.

[21] Appl. No.: 806,718

[22] Filed: Dec. 12, 1991

[51] Int. Cl.[5] .................. B01D 53/22; B01D 63/02; B01D 71/60

[52] U.S. Cl. .................................. 55/158; 55/16; 137/117; 251/61.4

[58] Field of Search .................. 55/16, 68, 158; 137/117; 251/61.4, 121

[56] References Cited

U.S. PATENT DOCUMENTS

| | | | |
|---|---|---|---|
| 3,114,387 | 12/1963 | Barkan et al. | 251/63.4 X |
| 3,511,470 | 5/1970 | Beckett et al. | 251/121 |
| 3,521,852 | 7/1970 | Gillis, Jr. | 251/121 |
| 3,668,837 | 6/1972 | Gross | 55/158 |
| 3,735,558 | 5/1973 | Skarstrom et al. | 55/16 |
| 3,834,383 | 9/1974 | Weigl et al. | 137/117 X |
| 3,874,629 | 4/1975 | Fontaine | 251/61.4 |
| 4,718,921 | 1/1988 | Makino et al. | 55/16 |
| 4,808,199 | 2/1989 | Yearout | 55/16 |
| 4,857,081 | 8/1989 | Taylor | 55/16 |
| 4,961,759 | 10/1990 | Taylor | 55/16 |
| 5,002,590 | 3/1991 | Friesen et al. | 55/16 |

FOREIGN PATENT DOCUMENTS

| | | | |
|---|---|---|---|
| 1064705 | 9/1959 | Fed. Rep. of Germany | 251/61.4 |
| 1-236921 | 9/1989 | Japan | 55/158 |
| 2-083015 | 3/1990 | Japan | 55/16 |

Primary Examiner—Robert Spitzer
Attorney, Agent, or Firm—Chernoff, Vilhauer, McClung & Stenzel

[57] ABSTRACT

A novel gas recycling valve for use with a hollow fiber gas dehydration module is disclosed, which allows a predetermined portion of the dried product gas to be returned as a sweep gas at a steady state, and automatically responsive to the feed gas flow rate through the module.

3 Claims, 1 Drawing Sheet

SWEEP VALVE FOR DEHYDRATION VALVE

BACKGROUND OF THE INVENTION

Hollow fiber membrane modules for gas dehydration are known. See, for example, U.S. Pat. No. 5,002,590. Such modules employ a lumen-side feed and a countercurrent flow, and it has recently been discovered, operate more efficiently when a small portion of the dried product gas or raffinate is recycled to the outside or shell side of the hollow fiber membranes as a sweep gas. Because the pressure of the water vapor-containing gas is variable, and because there is always some pressure drop through the lumens of the fibers, it is difficult to design a module that permits a predetermined portion of the product gas to be returned as the sweep gas at a relatively constant rate. This need has been met by the present invention.

SUMMARY OF THE INVENTION

In its principal aspect, the invention comprises a novel gas recycling, or sweep valve device that is automatically responsive to the volumetric flow of the feed gas through a hollow fiber membrane gas dehydration module, assuring a steady state return of an adjustable predetermined portion of the dried product gas as a sweep stream. In a closely-related aspect, the invention comprises a hollow fiber gas dehydration module in combination with the recycling or sweep valve.

DETAILED DESCRIPTION OF THE INVENTION

Figure 1:
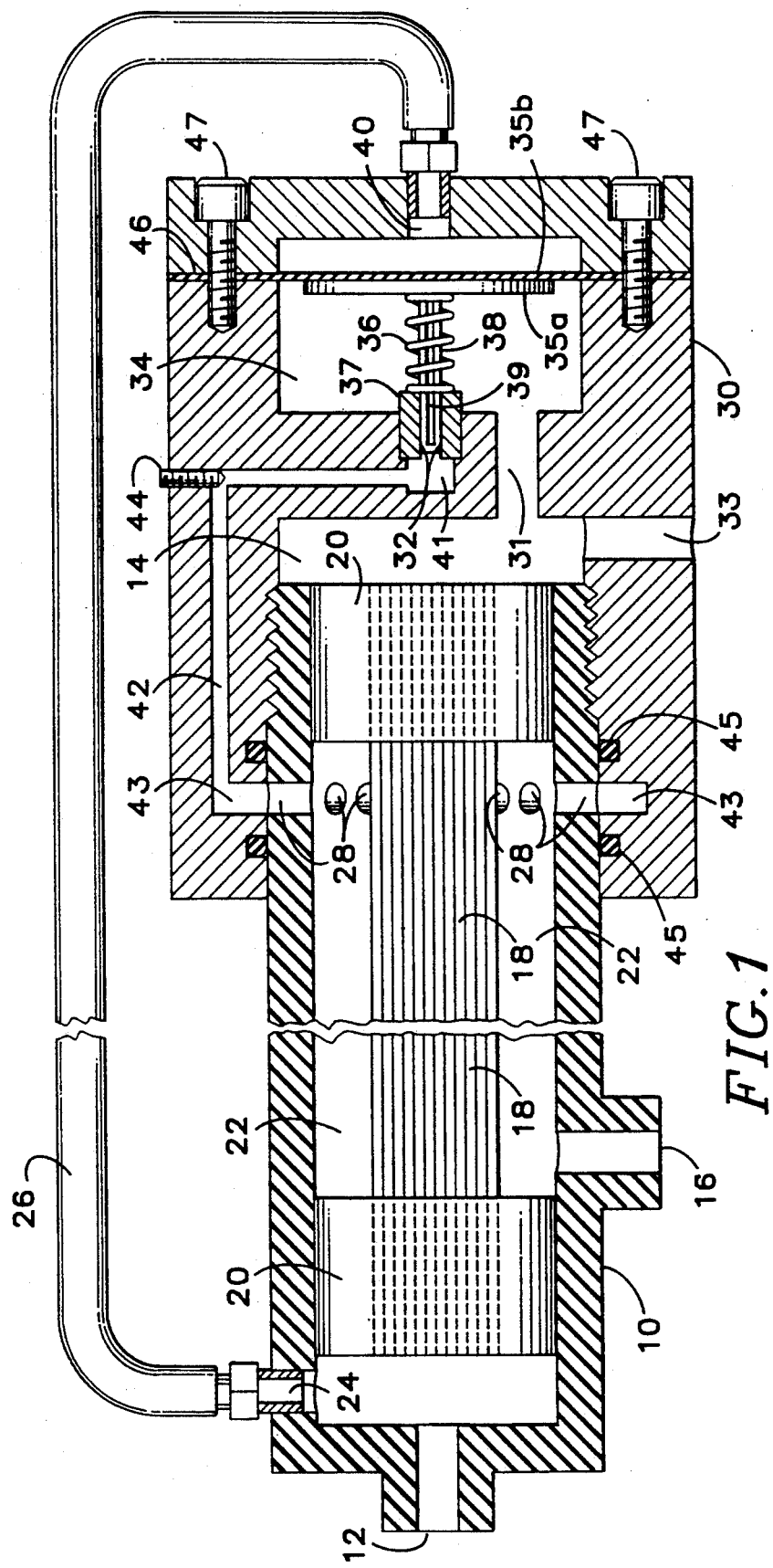
FIG. 1 is a foreshortened cross-sectional schematic of a hollow fiber gas dehydration module in combination with a cross-sectional schematic of the gas recycling or sweep valve device of the present invention.

According to the present invention, there is provided a novel gas recycling valve for use with a countercurrent flow hollow fiber membrane gas dehydration module. The valve makes possible the return as a sweep gas to the permeate side of the hollow fiber membranes an adjustable, predetermined portion of the dried product gas.

In it broadest aspect, the present invention comprises valve means having a variable restriction that communicates between the product end of the lumens of the hollow fiber membranes of a gas dehydration module and the shell side or outside of the hollow fibers, that is automatically responsive to changes in the pressure differential between the feed gas and the product gas (this differential representing the feed gas flow rate through the lumens), the variable restriction being urged toward opening in response to increases in the flow rate, and toward closing in response to decreases in the flow rate.

More specifically, there is provided a gas recycling valve comprising a valve body having an inlet port and an exhaust port and a plenum in fluid communication with said ports; a plunger valve assembly within said valve body, comprising a spring-biased movable pressure-responsive member and an elongate needle having a groove formed longitudinally thereon, movable in response to movement of the pressure-responsive member and matingly extending slidably through the exhaust port so that the groove is in fluid communication with the plenum; a gas pressure port in fluid communication with the pressure-responsive member for causing movement thereof; and means sealing the gas pressure port from communication with the inlet port and exhaust port.

Turning now to the drawing, wherein like numerals correspond to the same elements, there is shown in FIG. 1 a foreshortened cross-sectional schematic elevation of a hollow fiber gas dehydration module in combination with a cross-sectional schematic elevation of the gas recycling or sweep valve device. The hollow fiber gas dehydration module comprises a chamber 10 having a feed port 12, a raffinate plenum 14, a permeate port 16, thin-film composite hollow fiber membranes 18 arranged substantially parallel to each other, and sealing means 20, such as plugs of thermoplastic or thermosetting polymeric potting compound that secure and seal the bundle 18 to the module at both ends so as to permit the inside or lumens of the hollow fiber membranes to be in fluid communication with the feed gas. The feed gas to be dried is fed to the inside or lumens of the hollow fibers, thereby permitting water vapor in the feed gas to permeate from the lumens to the outside of each fiber, which in turn causes the permeate port 16 to be in fluid communication with the outside of the fibers and with the annular space 22 between the fiber bundle and the chamber and further requires the permeate to flow countercurrent to the direction of flow of the feed gas. The chamber is also provided with a feed end tap 24 in fluid communication with the feed port 12 and with feed pressure conduit 26. The chamber is further provided with sweep gas inlet ports 28 near its raffinate end.

The gas recycling or sweep valve comprises a valve body 30 with an inlet port 31, an exhaust port 32 and a raffinate port 33, the three ports 31, 32 and 33 being in fluid communication with both the raffinate plenum 14 of the dehydration module and a valve inlet plenum 34; a plunger valve assembly comprising a spring-biased movable pressure-responsive member comprising in combination plunger 35a and diaphragm 35b wherein a spring 36 is interposed between plunger 35a and guide 37 and is coiled helically around elongate needle 38 having longitudinal groove 39 formed longitudinally thereon, the groove at all times being in fluid communication with valve inlet plenum 34, the needle 38 mating with exhaust port 32 and slidably engaging guide 37; a gas pressure input port 40 in fluid communication via feed pressure conduit 26 with feed end tap 24 and with inlet plenum 34; exhaust chamber 41; exhaust line 42; and annular sweep gas input port 43.

Optionally, the sweep valve may be provided with an adjustment screw valve 44 for adjusting the flow of sweep gas through exhaust line 42. The sweep valve is also preferably provided with O-ring gaskets 45 to promote an air-tight seal between the sweep valve and the dehydration module. Diaphragm 35b serves to seal gas pressure inlet port 40 from communication with inlet port 31 and exhaust port 32, and optionally may also serve as a gasket 46 in the event the valve is constructed in two sections as shown in FIG. 1 and held together by means such as bolts 47.

In operation, pressurized water vapor-containing gas such as humid air enters feed port 12 and flows through the inside or lumens of hollow fiber membranes 18, water vapor permeating to the outside of the membranes and into annular space 22 and out through permeate port 16, with relatively drier air exiting the lumens of the fibers into raffinate plenum 14 and out raffinate port 33. A portion of such dry air enters the valve inlet plenum 34 via inlet port 31 and is in fluid communication with the groove 39 on needle 38. Due to the restriction and turbulence caused by the flow of the feed gas through the lumens of the fibers, there is always some pressure drop between the feed and raffinate ends of the dehydration module, so that pressure on the inlet plenum side of diaphragm 35b (the left side in FIG. 1) is less than that in the vicinity of the feed gas pressure input port side (the right side in FIG. 1). This pressure differential urges diaphragm 35b, plunger 35a and elongate needle 38 toward exhaust plenum 41 against the bias of spring 36, permitting the longitudinal groove 39 to be in fluid communication with exhaust plenum 41, thus permitting a predetermined portion of the dry gas to be returned to the annular space 22 of the dehydration module via exhaust line 42, sweep gas input port 43 and sweep gas inlet ports 28 in the housing of the module. Because the entry of the recycled gas is near the raffinate end of the module and the only outlet for such recycled gas is the permeate port 16 near the feed end, the flow of the recycled or sweep gas is in a direction generally opposite to the flow of the feed gas, or countercurrent. As the feed gas flow rate and thus the pressure differential varies, the force exerted on plunger valve assembly 35a and 35b will also vary, urging the grooved needle toward opening in response to increases in the flow rate, allowing the return of more sweep gas, and urging the grooved needle toward closing in response to decreases in the flow rate, thus restricting the return of sweep gas. In this manner, the variable restriction of the grooved needle is automatically responsive to changes in the feed gas flow rate.

EXAMPLE 1

A gas recycling valve incorporated into a module end cap of the construction shown in FIG. 1 was fitted to a dehydration module in substantially the same configuration shown in FIG. 1 comprising a 2.6 m$^2$ bundle of this film composite polyethersulfone fibers having a siloxane/diamide copolymer coating on the lumens thereof, the bundle being secured to the feed and product ends of the module by a polyurethane potting composition. A humid stream of air having a 35° C. dewpoint was passed through the lumens of the fibers at 100 psig (790 kPa) and 12 standard cubic feet/min (SCFM) and the needle valve adjustment screw adjusted to permit a return of a 17% portion of dried product air to the outside or permeate side of the hollow fibers through module sweep ports, resulting in a raffinate or product stream having a −9.3° C. dewpoint. The calculated feed gas loss due to the flow of sweep gas without the valve was approximately 30%.

EXAMPLES 2-6

Example 1 was repeated under substantially the same conditions while varying the flow rate as noted in Table I, with the results noted therein.

TABLE 1

| Ex. No. | Flow Rate* | Raffinate Dewpoint | Feed Loss Without Valve |
|---|---|---|---|
| 2 | 14 | −5° C. | 25% |
| 3 | 17 | −2° C. | 23% |
| 4 | 20 | −2° C. | 19% |
| 5 | 22 | −2° C. | 17% |
| 6 | 23 | −2° C. | 17% |

*SCFM

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In combination with a gas dehydration module containing a multiplicity of hollow fiber membranes in a chamber having respective feed and product ends and a permeate port, wherein the lumens of said hollow fiber membranes are in fluid communication with a feed gas containing water vapor and the outside of said hollow fiber membranes are in fluid communication with said permeate port, a gas recycling valve comprising valve means having a variable restriction, communicating between the product end of said chamber and the outside of said hollow fiber membranes and having a flow connection to said feed gas and automatically responsive to change in the feed gas flow rate through the lumens of said hollow fiber membranes, for urging said restriction toward opening in response to increases in said flow rate, and for urging said restriction toward closing in response to decreases in said flow rate.

2. A gas dehydration module for removing water from a feed gas comprising:
   (a) a chamber having respective feed and product ends and a permeate port near the feed end;
   (b) a multiplicity of hollow fiber membranes arranged longitudinally in said chamber, the lumens of said membranes being in fluid communication with the said feed gas, and the outside of said membranes being in fluid communication with said permeate port;
   (c) means for securing and sealing said hollow fiber membranes to said chamber at said feed and product ends; and
   (d) valve means having a variable restriction, communicating between the product end of said chamber and the outside of said hollow fiber membranes and having a flow connection to said feed gas and automatically responsive to changes in the feed gas flow rate through the lumens of said hollow fiber membranes, for urging said restriction toward opening in response to increases in said flow rate, and for urging said restriction toward closing in response to decreases in said flow rate.

3. A gas recycling valve comprising:
   (a) a valve body having an inlet port, an exhaust port, a raffinate port and a plenum in fluid communication with said ports;
   (b) a plunger valve assembly within said valve body, comprising a spring-biased movable pressure-responsive member and an elongate needle having a groove formed longitudinally thereon, movable in response to movement of said pressure-responsive member and matingly extending slidably through said exhaust port so that said groove is in fluid communication with said plenum;
   (c) a gas pressure input port in fluid communication with said pressure-responsive member for causing movement thereof; and
   (d) means sealing said gas pressure input port from communication with said inlet port and exhaust port.

* * * * *